(12) United States Patent
Stegemoeller

(10) Patent No.: US 10,184,300 B2
(45) Date of Patent: Jan. 22, 2019

(54) TRANSPORTABLE EQUIPMENT PLATFORM

(71) Applicant: Halliburton Energy Services, Inc., Houston, TX (US)

(72) Inventor: Calvin Lynn Stegemoeller, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 224 days.

(21) Appl. No.: 14/782,984

(22) PCT Filed: Aug. 29, 2013

(86) PCT No.: PCT/US2013/057183
§ 371 (c)(1),
(2) Date: Oct. 7, 2015

(87) PCT Pub. No.: WO2015/030757
PCT Pub. Date: Mar. 5, 2015

(65) Prior Publication Data
US 2016/0237757 A1    Aug. 18, 2016

(51) Int. Cl.
*E21B 7/02* (2006.01)
*E21B 15/00* (2006.01)
*B62D 53/06* (2006.01)
*E21B 43/25* (2006.01)

(52) U.S. Cl.
CPC ............ *E21B 15/00* (2013.01); *B62D 53/062* (2013.01); *E21B 7/02* (2013.01); *E21B 43/25* (2013.01)

(58) Field of Classification Search
CPC . E21B 15/00; E21B 43/25; E21B 7/02; B60P 3/00; B60P 1/025; B60P 1/027; B60P 1/04; B60G 2300/38; B60G 2300/04; B60G 2500/30; B62D 53/061; B62D 53/062;
(Continued)

(56) References Cited

U.S. PATENT DOCUMENTS 3,083,987 A * 4/1963 Woolslayer ............... B60T 3/00
254/94
4,474,254 A   10/1984 Etter et al.
4,597,437 A    7/1986 McNabb
(Continued)

FOREIGN PATENT DOCUMENTS

WO    2015030757 A1    3/2015

OTHER PUBLICATIONS

Wikipedia entry for "Fifth-wheel coupling", https://en.wikipedia.org/wiki/Fifth-wheel_coupling, Jun. 30, 2017.*
(Continued)

*Primary Examiner* — Keith J Frisby
(74) *Attorney, Agent, or Firm* — McGuireWoods LLP

(57) ABSTRACT

Disclosed is a mobile platform on which equipment is mounted. A structural frame for a platform used to transport equipment may include a bottom rail configured to rest on the ground, a top rail vertically offset from the bottom rail, a plurality of pillars extending between the top and bottom rails, a forward support point, and an aft support point, wherein the structural frame is configured to support a downward force on the bottom rail when the structural frame is suspended between the forward and aft support points.

16 Claims, 2 Drawing Sheets

(58) Field of Classification Search
CPC ........ B62D 53/065; B62D 63/06; B62D 1/12; B62B 1/10
USPC ............. 280/789, 47.23; 137/899.3; 175/206
See application file for complete search history.

(56) References Cited

U.S. PATENT DOCUMENTS

| | | | |
|---|---|---|---|
| 5,375,899 A | * | 12/1994 | Wright .................... B60P 3/025 296/21 |
| 6,808,626 B2 | | 10/2004 | Kulbeth |
| 2005/0248183 A1 | | 11/2005 | Booher |
| 2009/0308602 A1 | | 12/2009 | Bruins et al. |

OTHER PUBLICATIONS

International Search Report and Written Opinion for PCT/US2013/057183 dated May 19, 2014.

\* cited by examiner

TRANSPORTABLE EQUIPMENT PLATFORM

BACKGROUND

The present disclosure relates generally to systems and methods for providing equipment at a well site or other remote location and, in particular, a mobile platform on which equipment is mounted.

To produce hydrocarbons (e.g., oil, gas, etc.) from a subterranean formation, wellbores may be drilled that penetrate hydrocarbon-containing portions of the subterranean formation. The wellbores are frequently located at well sites that are distant from facilities and services and any equipment needed at the well site must be transported over roads that may include unimproved dirt roads.

Generally, after a wellbore has been drilled to a desired depth, completion operations are performed. Such completion operations may include inserting a liner or casing into the wellbore and, at times, cementing the casing or liner into place. Once the wellbore is completed as desired (lined, cased, open hole, or any other known completion), a stimulation operation may be performed to enhance hydrocarbon production into the wellbore. Examples of some common stimulation operations involve hydraulic fracturing, acidizing, fracture acidizing, and hydrajetting. Stimulation operations are intended to increase the flow of hydrocarbons from the subterranean formation surrounding the wellbore into the wellbore itself so that the hydrocarbons may then be produced up to the wellhead.

Various types of surface equipment, such as pumps, mixers, and manifold systems may be required at the well site in order to accomplish these completion and stimulation operations. Many of the operations are performed once or only at infrequent intervals and, therefore, the surface equipment is often only required for short periods of time. In such circumstances, the equipment is typically brought to the well site on trucks, such as tractor-trailers, used to perform the operation, and then removed via the truck.

Traditional oil field service equipment commonly employs over-the-road trailer frame designs to carry the equipment to the well site and then function as a platform to operate the equipment during the service work. The traditional trailer frame designs, however, do not function well as a working platform. For instance, the working platform of a traditional trailer frame is often several feet above the ground in order to provide road clearance. In most cases, the height of the working platform exceeds the height of the rear tires, thereby requiring ladders to access the platform and fall protection equipment for operators and maintenance personnel. Moreover, equipment may hang down on the outside of a traditional frame to improve the accessibility by a worker standing on the ground. In such scenarios, however, this may increase the risk of damage to the equipment during transport from road obstructions common to unimproved roads. Accordingly, optimal mounting of equipment and its orientation is routinely inhibited by the traditional frame rails.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
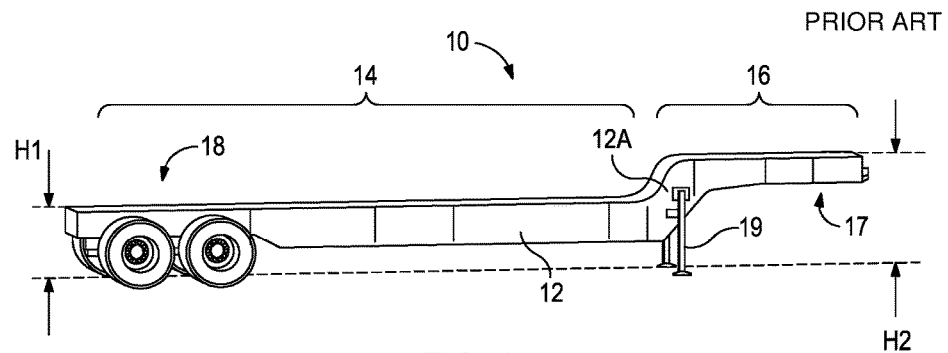
FIG. 1 depicts a traditional over-the-road trailer frame.

The present disclosure relates generally to systems and methods for providing equipment at a well site or other remote location and, in particular, a mobile platform on which equipment is mounted.

The disclosed embodiments are directed to a transportable equipment platform on which various sets of equipment can be mounted for use in the oil and gas industry. The entire equipment platform may then be transported to a remote location, such as a well site, and thus provides a pre-assembled system adapted to provide a specific function or service. While this has been previously accomplished by conventional trailer-mounted systems, the systems disclosed herein are more stable when in place and more ergonomical than conventional systems.

While the disclosed methods and apparatus are discussed in terms of a transportable equipment platform for use at an oil and/or gas well site, the same principles and concepts may be equally employed for providing equipment sets at other sites. The systems disclosed herein may be used to transport and ergonomically position industrial equipment of any kind that would potentially benefit from a low working height and improved maintenance accessibility. For example, a facility may require a high-volume refrigeration unit for only a short period of time and would prefer to lease the equipment rather than permanently install such a system. Pursuant to the presently described systems, a self-contained high-volume refrigeration unit could be installed on the disclosed transportable equipment platform and transported to the facility for short-term use, then removed.

Within this disclosure, the term "tractor" and the like refers to an over-the-road vehicle having an engine and a coupling mechanism for releasable attachment of a cargo trailer. A combination of a tractor and a trailer may be referred to using one of the terms "tractor-trailer," "semitrailer truck," "transport," "prime mover," "semi," "big rig," "18-wheeler."

Within this disclosure, the phrase "king pin" refers to a mechanism on a towable apparatus, such as a trailer, that is configured to releasably attach to a "fifth wheel" or other hitch point of a tractor to allow the tractor to pull the towable apparatus.

Within this disclosure, the phrase "on the ground" and the like refers to placement of an apparatus, such as the structural frame disclosed herein, directly on the surface of the ground or on local supports. Local supports can include, but are not limited to, timbers or metal plates that do not add significant height to the placement of the structural frame above that of a direct placement on the ground. These local supports may be loose and placed on the ground just before the apparatus is lowered onto the ground or may be attached to the apparatus, such as in the case of a skid plate that is welded to the underside of a lower corner of the disclosed structural frame.

In addition, the phrase "on the ground" does not imply that all of the underside of the apparatus is in contact with the ground, as the contour of the ground may not be identical to the contour of the underside of the apparatus. Moreover, the use of jackstands or other supports under a portion of the apparatus, whether placed between the apparatus and the ground before, during, or after placement of the apparatus on the ground, does not depart from the scope of the phrase "on the ground." Furthermore, a manufactured surface, such as a concrete pad or a paved roadbed that allows a tractor-trailer to drive over the manufactured surface, is equivalent to the ground in this usage and placement of an apparatus on such a surface is within the scope of "on the ground."

One or more illustrative embodiments incorporating the principles of the present disclosure are presented herein. Not all features of an actual implementation are described or shown in this application for the sake of clarity. It is understood that in the development of an actual embodiment incorporating the present disclosure, numerous implementation-specific decisions must be made to achieve the developer's goals, such as compliance with system-related, business-related, government-related and other constraints, which vary by implementation and from time to time. While a developer's efforts might be complex and time-consuming, such efforts would be, nevertheless, a routine undertaking for those of ordinary skill in the art having benefit of this disclosure.

FIG. 1 depicts an over-the-road trailer frame 10 such as may be used for an equipment trailer. This type of trailer is sometimes referred to a "single drop" or "drop deck" trailer. The frame 10 typically has two main beams 12 running fore-and-aft between the rear axles 18 and the front king pin 17, with cross-beams (not visible in FIG. 1) connected between the main beams 12. The load created by the weight of the equipment loaded onto the trailer frame 10 may require the vertical dimension of the main beams 12 to be large, for example, around 18 inches or more. In a single-drop trailer, the main beams 12 have "S" bends 12A located at midpoints to drop from the height required for the king pin 17 to engage the "fifth wheel" or hitch of a tractor to a lower height for the majority of the length of the trailer.

Extendable legs 19 are attached to the main beams 12 and may be extended when the trailer frame 10 is parked, thereby allowing the tractor to decouple from the trailer frame 10 and depart. The rear portion 14 of the trailer frame may be 38-43 feet long and have a lower deck height H1 of approximately 48 inches. The forward portion 16 of the trailer frame may be 10 feet long and have a top surface with an upper deck height H2 of 66 inches, for example. The structural requirements of the "S" bend in the main beams 12 may add significant weight and stress riser complications to the main beams 12, thereby reducing the load capability of the trailer 10.

Figure 2A:
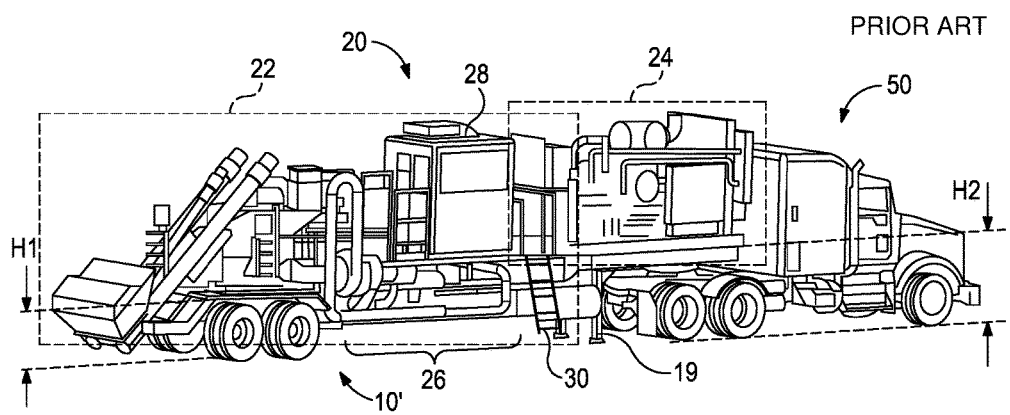
FIG. 2A depicts an equipment trailer attached to a tractor.

FIG. 2A depicts another equipment trailer 20 as attached to a tractor 50. The heights H1 and H2 of the rear and forward portions of an underlying trailer frame 10', which may be similar to the trailer frame 10 of FIG. 1, are shown for reference. The trailer 20 has a first set of equipment 22 located on the rear portion of the trailer frame 10' and a second set of equipment 24 mounted on the forward portion of the trailer frame 10'. The first set of equipment 22 may include an operator cabin 28 that requires a user to climb a ladder 30 to access the cabin 28 from the ground because of the height H1 of the rear portion of the trailer frame 10' (including the elevated work platform and ladder(s) for equipment maintenance access).

The first set of equipment 22 has a manifold 26 that is mounted outside of the main beams 12 of the trailer frame 10'. Several hoses (not shown in FIG. 2A) can be attached to couplings of the manifold 26 by users standing on the ground. The manifold 26, and other equipment mounted in similar locations on the trailer frame 10', is near the ground and therefore exposed to roadside obstructions such as rocks and trees that may damage the manifold 26 during transport of the equipment trailer 20.

The illustrated equipment trailer 20 may require that the tractor 50 remain attached thereto during operations due to stability problems when the front of the equipment trailer 20 is supported by only the extendable legs 19. As the extendible legs 19 are often attached directly to the main beams 12 (FIG. 1) and the platform that is built upon the frame 10' is wider than the separation of the main beams 12, the extendible legs are 19 are not positioned at the outside edges of the equipment trailer 20. Since the equipment sets 22, 24 are often heavy and mounted high above the ground, there is a risk that operation of the equipment 22, 24 may cause the equipment trailer 20 to destabilize and potentially overturn if supported only by the extendible legs 19. Such may be the case when the ground below the equipment trailer 20 is soft or otherwise unstable.

Figure 2B:
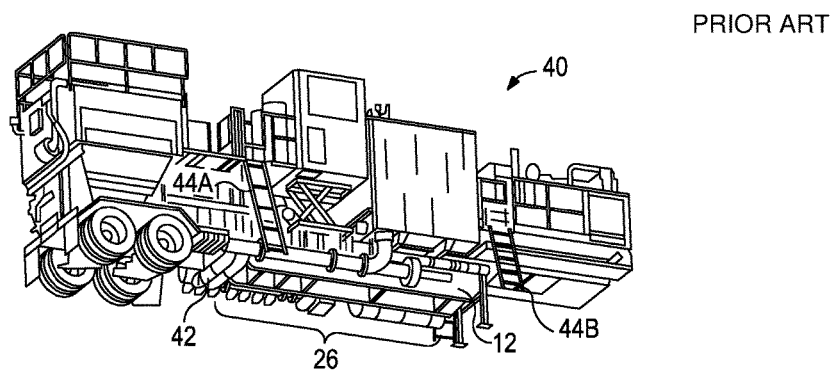
FIG. 2B is a bottom view of another equipment trailer.

FIG. 2B is an isometric bottom view of another equipment trailer 40. In this view, piping 42 that passes under the main beams 12 is visible. Process piping that must run laterally across the trailer 20 may not be able to run over the main beams 12, for example because of interference with other equipment or a restriction on an upward displacement of a fluid line, and so must run under the main beams 12 as shown for piping 42. In other embodiments, the piping 42 may extend through one or more openings (not shown) in the main beams 12, with resulting stress riser considerations. This downward jog in the flow path of piping 42 may create an undesirable air trap in the piping 42. In addition, the piping 42 is exposed to debris on the road during transport as well as any bumps or potholes as may be present on the dirt roads that lead to well sites.

Figure 3:
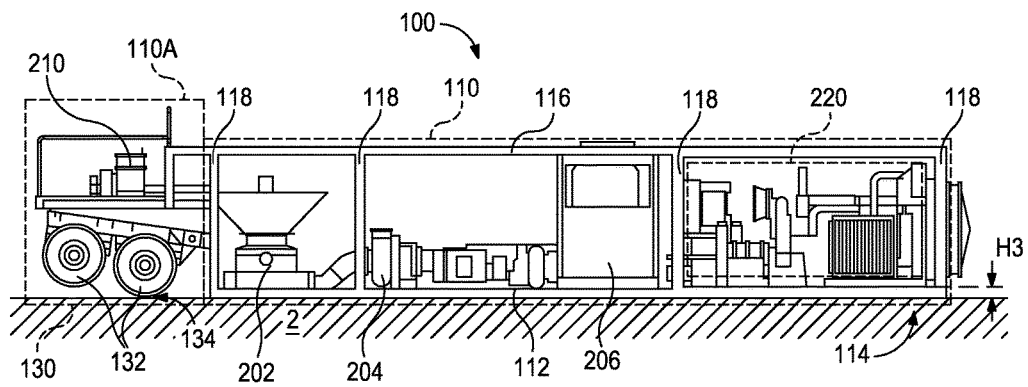
FIG. 3 is a side view of an exemplary transportable equipment platform in an operational configuration, according to one or more embodiments.

FIG. 3 is a side schematic view of an exemplary transportable equipment platform 100 in an operational configuration, according to one or more embodiments. The transportable equipment platform 100 has a structural frame 110 comprising a bottom rail 112 configured to rest directly on the ground 2, a top rail 116, and a plurality of pillars 118 coupled between the top and bottom rails 116, 112. In certain embodiments, there may be two or more top rails 116 arranged in parallel in a fore-and-aft direction. Similarly, in certain embodiments, there may be two or more bottom rails 112 arranged in parallel in a fore-and-aft direction.

In certain embodiments, the structural frame 110 may be about 8 feet to about 12 feet wide with lateral supports (not visible in FIG. 4A) passing laterally between pairs of the top rails 116 or between pairs of the bottom rails 112. The length of the structural frame 110 may range between about 40 feet and about 50 feet. In certain embodiments, the lateral supports may run at an angle, e.g., passing in a fore-and-aft direction as well as side-to-side, between the pair of top rails 116 or between the pair of bottom rails 112. In certain embodiments, the lateral supports may run at an angle, e.g., passing in an up-and-down direction as well as side-to-side, between the pillars 118 or between a top rail 116 and a bottom rail 112.

The top and bottom rails 116, 112, the pillars 118, and the lateral supports may be provided in any shape or form known to those of skill in the art, for example, rectangular and/or round tubing, U-channel, L-channel, I-beams, C-beams, solid round or rectangular beams, combinations thereof, and the like. The top and bottom rails 116, 112, the pillars 118, and the lateral supports may also be made of one or more materials considered suitable for a structural system by those of skill in the art, for example steel, nickel, zinc, chromium, and any alloy made thereof. In other embodiments, the top and bottom rails 116, 112, the pillars 118, and the lateral supports may be made of other materials, such as, but not limited to, composite materials, fibers comprising one or more of a metal, a carbon, a glass, and a polyamide, and other materials such as aluminum, plastic, and rubber.

The pillars 118 and the associated lateral supports may be structurally attached to the top and bottom rails 116, 112 by any attachment means known to those of skill in the art. For example, the components may be coupled using mechanical fasteners (e.g., bolts, pins, screws, clamps, etc.), or may be welded or brazed to each other. Such coupling means may be undertaken with or without auxiliary junction elements (not shown in FIG. 4A) formed from any of the materials listed above for the top and bottom rails 116, 112, the pillars 118, and the lateral supports. In certain embodiments, the structural frame 110 is formed primarily of rectangular tubing or tubes that are welded together such that the interior of the rectangular tubes is protected from exposure to the environment.

While not depicted in FIG. 3, in certain embodiments, at least one of the pillars 118 may be vertical while one or more of the remaining pillars 118 may run at an angle with respect to horizontal, e.g., passing in a for-and-aft direction as well as up-and down. In certain embodiments, all the pillars 118 may be vertical as this may improve accessibility to the equipment arranged on the structural frame 110.

As shown in FIG. 3, the structural frame 110 may support or otherwise house various types of equipment. For instance, a power pack 220 (e.g., motor, generator, compressor, pump, turbine, etc.) may be mounted on a forward portion of the structural frame 110 and configured to provide power for the various pieces of equipment associated therewith. An operator cabin 206 may also be mounted on the bottom rails 112. Since the structural frame 110 rests directly on the ground 2, users are not required to climb a ladder to access the cabin 206. Moreover, with the structural frame 110 resting directly on the ground 2, users and operators are able to access the equipment for maintenance without the use of ladders and/or protective gear (e.g., harnesses, etc.). Other types of equipment that may be mounted to or otherwise included in the structural frame 110 include, but are not limited to, an operator's station, dry or wet materials addition equipment, one or more prime movers, and power transmission equipment.

In addition, a reservoir 202 (e.g., a mixer) and a pump 204 may be mounted on the bottom rail 112 to provide easy access for introducing material into the reservoir 202. For example, small quantities of dry chemicals may be added by hand into the top of reservoir 202, and the relative location of the pump 204 may nonetheless provide a low suction head required to draw material from the reservoir 202. In certain embodiments, the structural frame 110 may be configured to allow a pump (e.g., the pump 204) and its associated piping system to be mounted on the bottom rail 112 such that an input of the pump 204 via the piping system is at or below an outlet of a reservoir (e.g., the reservoir 202). This may prove advantageous so that the piping system is not required to draw fluid upward from the outlet of the reservoir 202, which may create an undesirable air trap in the piping system.

In some embodiments, the reservoir 202 is not mounted on the equipment platform 100, but may instead encompass a frac tank (not shown) situated on the ground 2 near the equipment platform 100 and configured to feed the pump 204 via its associated piping system. In such embodiments, it may prove advantageous to have the pump 204 and its associated piping system mounted at ground level on the bottom rail 112 such that the pump 204 is not required to draw fluid upward from the outlet of the frac tank, which may create an undesirable air trap in the piping system. Additionally, fluids may be transferred from truck-mounted storage tanks (not shown) to the input of the reservoir 202 without the need for a transfer pump.

The top and bottom rails 116, 112 and the pillars 118 cooperate the form a space-frame style framework that, in certain embodiments, provides support and rigidity that may be commensurate with the support and rigidity of other trailer frames (e.g., the trailer frame 10 of FIG. 1). In certain embodiments, a space-frame equipment platform 100 may weigh less than a comparable conventional trailer frame, thereby increasing the allowable equipment weight while keeping the gross vehicle weight within allowable limits.

Figure 4A:
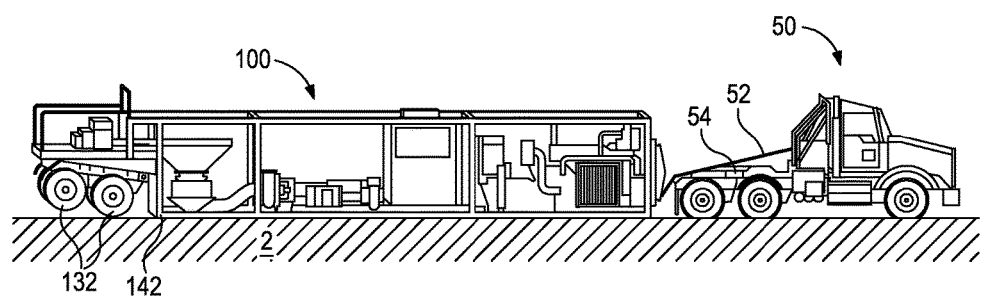
FIG. 4A is a side view of the transportable equipment platform of FIG. 3 being loaded onto a tractor for transport, according to one or more embodiments.

The structural frame 110 has at least one forward support point and at least one aft support point. In certain embodiments, the forward support point is provided as a king pin (not entirely visible in FIG. 3) that is disposed on an underside of the structural frame 110, as indicated by the reference indicator 114. In certain embodiments, the king pin 114 is configured to be coupled to a fifth wheel or other releasable attachment point of a tractor 50 (FIG. 4A). In certain embodiments, the aft support point is provided as an axle assembly 130 that is attached to a rear portion of the structural frame 110. In the embodiment shown in FIG. 3, for example, the structural frame 110 may include a rear extension 110A that extends rearward from a main portion of the structural frame 110 and may have a space underneath where the axle assembly 130 is located. At the back end of the structural frame 110, the axle assembly 130 is attached to at least one of the structural frame 110 and the rear extension 110A. A hydraulic power pack 210, for example, may also be arranged on the rear extension 110A.

In the configuration shown in FIG. 3, with the structural frame 110 resting directly on the ground 2, there may be a small clearance 134 between the wheels 132 and the ground 2. In certain embodiments, one wheel assembly of wheels 132 may be in contact with the ground 2 while a second wheel assembly of wheels 132 may be offset from the ground 2. This clearance ensures that all loads are supported directly through the structural frame 110 to the ground 2, thereby eliminating the flexibility of the wheels 132 and improving the stability of the equipment platform 100 while in use. Since the entire width of the structural frame 110 is supported by the ground, the risk of the transportable equipment platform 100 destabilizing or otherwise overturning is drastically reduced or otherwise negligible. As a result, the tractor 50 (FIG. 4A) may be decoupled from the equipment platform 100 and used for other tasks during operation of the transportable equipment platform 100.

With the structural frame 110 resting on the ground, the height H3 of the working deck, e.g., the top of the bottom rail 112, is much less than the height H1 (FIGS. 1 and 2A) of other trailers and, in certain embodiments, may be less than 8 inches above the ground 2. This relatively low height H3 may eliminate the need for ladders and thereby provide easier access to the equipment 202, 204, and 220 by users standing on the ground 2. The height H3 may also eliminate the need for equipment to hang down in an exposed position, as was the case for the manifold 26 of FIG. 2A, and therefore eliminate or reduce the risk of damage to equipment during transport while still providing the equipment at a convenient height for access by users standing on the ground 2. In certain embodiments, no equipment associated with the equipment platform 100 extends below the bottom rails 112. Moreover, in certain embodiments, no equipment extends laterally past either side of the structural frame 110.

Referring now to FIG. 4A, illustrated is a side view of the equipment platform 100 of FIG. 3 being loaded onto a tractor 50 for transport, according to one or more embodiments. In the example of FIG. 4A, a winching cable 52 is attached to a tow point (not visible in FIG. 4A) of the structural frame 100. When tension is applied to the cable 52 by a winch of the tractor 50, the front of the equipment platform 100 is lifted upward and forward onto the rear portion of the tractor 50. In some embodiments, one or more jacks or lifting devices (not shown) may be used to help raise the equipment platform 100 to the level of the tractor 50. The upward motion of the front of the structural frame 110 causes the structural frame 110 to pivot on a lower, rear corner 142 until one or more of the wheels 132 contacts the ground 2. Further upward motion of the front of the structural frame 110 transfers the load from the corner 142 to the wheels 132. Once the load is fully supported by the wheels 132, thereby unloading the corner 142, the structural frame 110 may move forward on the wheels 132 under the urging of the cable 52.

In one or more embodiments, one or more hydraulic or otherwise powered jacks (not shown) may be included in the equipment platform 100 at or near front thereof. The jacks may be configured to raise the equipment platform 100 such that the tractor 50 is able to insert itself underneath the equipment platform 100 at its front end, thereby allowing the equipment platform 100 to be coupled to the tractor 50. In such embodiments, the winch and associated cable 52 may be omitted or used in combination thereof, without departing from the scope of the disclosure.

Figure 4B:
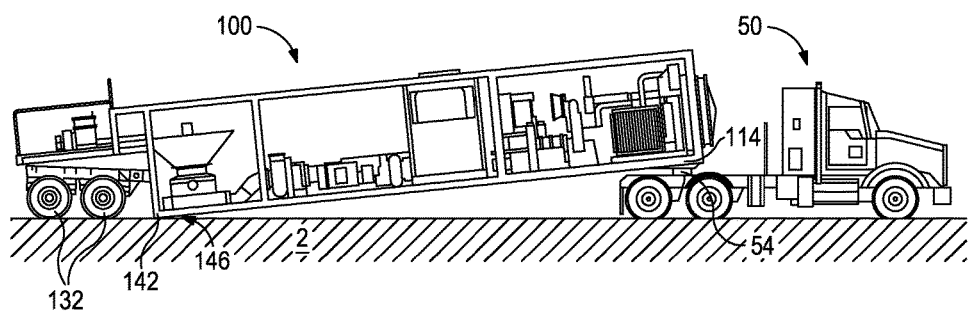
FIG. 4B is a side view of the transportable equipment platform of FIG. 3 attached to a tractor for transport, according to one or more embodiments.

FIG. 4B is a side view of the transportable equipment platform 100 of FIG. 3 as mounted on and otherwise attached to the tractor 50 for transport, according to one or more embodiments. The king pin 114 is coupled to a fifth wheel 54 associated with the tractor 50 and the weight of the equipment platform 100 is fully supported by the fifth wheel 54 and the wheels 132. In the mounted configuration shown in FIG. 4B, there is a clearance 146 between the corner 142 and the ground 2 such that the corner 146 does not contact the ground during transport. Advantageously, the part of the transportable equipment platform 100 that is closest to the road is a structural member and not a piece of expensive equipment and, thus, the structural frame 110 also serves as a "skid plate" to protect the equipment 202, 204, and 220. In certain embodiments, the clearance 146 may be greater than 12 inches. In certain embodiments, the corner 142 may be shaped to provide increased clearance 146 while in the mounted configuration of FIG. 4B. In certain embodiments, the corner 142 may comprises a removable element (not shown in FIG. 4B) that allows the structural frame 110 to pivot on the removable element, which is then removed to provide increased clearance 146 under corner 142.

The structural frame 110 is configured to support a downward force, for example as created by the equipment 202, 204, 206, and 220, that is applied to the bottom rail 112 when the structural frame 112 is suspended between the forward and aft support points, e.g., when the equipment platform 100 is supported by the king pin 114 and the axle assembly 130. The structural frame 110 is configured to carry the loads induced by the acceleration and motion of the equipment 202, 204, 206, and 220 when the tractor 50 is transporting the equipment platform, including transport over dirt or paved roads and over bumps, rocks, ditches, and other irregularities in the road surface.

In some embodiments, the structural frame 110 may include one or more attachment points (not shown) for attaching sound attenuation materials, devices, and/or barriers (not shown) to the equipment platform 100. Such sound attenuation materials, devices, and/or barriers may be required in some geographical locations and otherwise beneficial for sound reduction associated with the overall safety of operators (e.g., hearing capability, damage to hearing, etc.). In some embodiments, the attachment points may also prove advantageous in allowing for the attachment of environmental protection features such as, but not limited to, tarps, shades, and insulating panels for cold/hot weather.

In summary, the disclosed transportable equipment platform provides a mobile system that is stable by itself when off-loaded from the tractor that transported the equipment platform to the well site or other job location. The equipment platform provides easier access to the equipment since the height of the equipment is reduced, compared to conventional equipment trailers. The height at which materials must be introduced to the system and the suction head of any pumps in the system may also be reduced through the configurations disclosed herein.

Unless indicated to the contrary, the numerical parameters set forth in the following specification and attached claims are approximations that may vary depending upon the desired properties sought to be obtained by the present disclosure. At the very least, and not as an attempt to limit the application of the doctrine of equivalents to the scope of the claim, each numerical parameter should at least be construed in light of the number of reported significant digits and by applying ordinary rounding techniques.

Embodiments Disclosed Herein Include:

A. A structural frame for a platform used to transport equipment including a bottom rail configured to rest on the ground, a top rail vertically offset from the bottom rail, a plurality of pillars extending between the top and bottom rails, a forward support point, and an aft support point, wherein the structural frame is configured to support a downward force on the bottom rail when the structural frame is suspended between the forward and aft support points.

B. An equipment assembly that include a platform comprising a structural frame comprising a bottom rail configured to rest directly on the ground, a top rail, a plurality of pillars coupled between the top and bottom rails, a forward support point, and an aft support point, and one or more pieces of equipment coupled to the bottom rail, wherein the structural frame supports the one or more pieces of equipment on the bottom rail when the structural frame is suspended between the forward and aft support points.

Each of embodiments A and B may have one or more of the following additional elements in any combination: Element 1: wherein the aft support point is an axle assembly comprising one or more axles having at least two wheels associated with each axle. Element 2: wherein the forward support point is a king pin and that supports the bottom rail off the ground when the king pin is attached to a tractor. Element 3: wherein at least two wheels of the axle assembly are in contact with the ground when the king pin is attached to a tractor. Element 4: wherein all of the wheels of the axle assembly are in contact with the ground when the king pin is attached to a tractor. Element 5: wherein at least two wheels of the axle assembly are not in contact with the ground when the bottom rail is resting directly on the ground. Element 6: wherein all of the wheels of the axle assembly are not in contact with the ground when the bottom rail is resting directly on the ground. Element 7: wherein the structural frame is configured to be transported by a tractor when the king pin is attached to the tractor. Element 8: further comprising a pump and associated piping mounted on the bottom rail such that an input of the pump is at or below an outlet of a reservoir so that the pump does not draw fluid upward from the outlet of the reservoir.

Element 9: wherein no portion of the one or more pieces of equipment extend below the bottom rail. Element 10: wherein no portion of the one or more pieces of equipment extend laterally past either side of the bottom rail. Element 11: further comprising an axle assembly coupled to the aft support point, the axle assembly comprising one or more axles and each axle comprising at least two wheels. Element 12: further comprising a king pin coupled to the forward support point, wherein the bottom rail is not in contact with the ground when the king pin is attached to a tractor. Element 13: wherein at least two wheels of the axle assembly are in contact with the ground when the king pin is attached to a tractor. Element 14: wherein all of the wheels of the axle assembly are in contact with the ground when the king pin is attached to a tractor. Element 15: wherein at least two wheels of the axle assembly are not in contact with the ground when the bottom rail is resting directly on the ground. Element 16: wherein all of the wheels of the axle assembly are not in contact with the ground when the bottom rail is resting directly on the ground. Element 17: wherein the structural frame is configured to be transported by the tractor when the king pin is attached to the tractor. Element 18: wherein the one or more pieces of equipment comprise a pump and associated piping mounted such that an input of the pump is at or below an outlet of a reservoir so that the pump does not draw fluid upward from the outlet of the reservoir. Element 19: further comprising one or more attachment points provided on the structural frame, the one or more attachment points being configured to facilitate attachment of at least one of a sound attenuation devices or barriers, a tarp, a shade, and insulating panels.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The disclosure illustratively described herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A structural frame for a platform used to transport equipment, comprising:
    a bottom rail configured to rest on the ground, wherein the bottom rail includes a lower rear corner and a forward support point both configured to rest on the ground;
    a top rail vertically offset from the bottom rail;
    a plurality of pillars extending between the top and bottom rails; and
    an aft support point including an axle assembly attached to the bottom rail, the axle assembly including a first wheel assembly and a second wheel assembly, offset from the first wheel assembly relative to the ground, each wheel assembly having at least two wheels associated with a respective axle, wherein the lower rear corner of the bottom rail extends beyond the at least two wheels of the first and second wheel assembly to provide a clearance between the at least two wheels of the first and second wheel assembly and the ground, the forward support point and the aft support point rotate about the lower rear corner of the bottom rail, and the structural frame is configured to support a downward force on the bottom rail when the structural frame is suspended between the forward and aft support points.

2. The structural frame of claim 1, wherein the forward support point supports the bottom rail off the ground when the forward support point is attached to a tractor.

3. The structural frame of claim 2, wherein at least two wheels of the axle assembly are in contact with the ground when the support point is attached to a tractor.

4. The structural frame of claim 3, wherein all of the wheels of the axle assembly are in contact with the ground when the forward support point is attached to a tractor.

5. The structural frame of claim 2, wherein all of the wheels of the axle assembly are not in contact with the ground when the bottom rail is resting directly on the ground.

6. The structural frame of claim 2, wherein the structural frame is configured to be transported by a tractor when the forward support point attached to the tractor.

7. The structural frame of claim 2, further comprising a pump mounted on the bottom rail such that a portion of the pump is at or below a reservoir so that the pump does not draw fluid upward from the reservoir.

8. An equipment assembly, comprising:
    a platform comprising a structural frame comprising a bottom rail configured to rest directly on the ground, wherein the bottom rail includes a lower rear corner and a forward support point both configured to rest on the ground, a top rail, a plurality of pillars coupled between the top and bottom rails, and an aft support point including an axle assembly attached to the bottom rail, the axle assembly including a first wheel assembly and a second wheel assembly, offset from the first wheel assembly relative to the ground, each wheel assembly having at least two wheels associated with a respective axle, wherein the lower rear corner of the bottom rail extends beyond the at least two wheels to provide a clearance between the at least two wheels of the first and second wheel assembly and the ground, the forward support point and the aft support point rotate about the lower rear corner of the bottom rail; and one or more pieces of equipment coupled to the bottom rail, wherein the structural frame supports the one or more pieces of equipment on the bottom rail when the structural frame is suspended between the forward and aft support points.

9. The equipment assembly of claim 8, wherein no portion of the one or more pieces of equipment extend below the bottom rail.

10. The equipment assembly of claim 8, wherein no portion of the one or more pieces of equipment extend laterally past either side of the bottom rail.

11. The equipment assembly of claim 8, wherein the bottom rail is not in contact with the ground when the forward support point is attached to a tractor.

12. The equipment assembly of claim 11, wherein at least two wheels of the axle assembly are in contact with the ground when the forward support point is attached to a tractor.

13. The equipment assembly of claim 12, wherein all of the wheels of the axle assembly are in contact with the ground when the forward support point attached to a tractor.

14. The equipment assembly of claim 11, wherein all of the wheels of the axle assembly are not in contact with the ground when the bottom rail is resting directly on the ground.

15. The equipment assembly of claim 11, wherein the structural frame is configured to be transported by the tractor when the forward support point is attached to the tractor.

16. The equipment assembly of claim 8, wherein the one or more pieces of equipment comprise a pump mounted such that a portion of the pump is at or below a reservoir so that the pump does not draw fluid upward from the reservoir.

* * * * *